(12) United States Patent
Castillo et al.

(10) Patent No.: US 8,229,997 B2
(45) Date of Patent: Jul. 24, 2012

(54) METHOD AND SYSTEM USING A PORTABLE OBJECT FOR PROVIDING AN EXTENSION TO A SERVER

(75) Inventors: Laurent Castillo, Saint Germain en Laye (FR); Christoph Siegelin, Paris (FR)

(73) Assignee: Gemalto SA, Meudon (FR)

( * ) Notice: Subject to any disclaimer, the term of this patent is extended or adjusted under 35 U.S.C. 154(b) by 576 days.

(21) Appl. No.: 11/993,778

(22) PCT Filed: Jun. 22, 2006

(86) PCT No.: PCT/IB2006/001684
§ 371 (c)(1),
(2), (4) Date: Feb. 25, 2010

(87) PCT Pub. No.: WO2006/136923
PCT Pub. Date: Dec. 28, 2006

(65) Prior Publication Data
US 2010/0153718 A1    Jun. 17, 2010

(30) Foreign Application Priority Data
Jun. 24, 2005  (EP) ..................................... 05291370

(51) Int. Cl.
*G06F 15/16* (2006.01)
(52) U.S. Cl. ........ 709/201; 709/203; 709/226; 709/229; 709/214; 709/239; 709/230; 709/236; 709/206; 709/205; 709/235; 709/219; 235/380; 235/385; 235/382; 235/375; 713/159; 713/168; 726/2; 726/20; 705/41; 705/66; 705/25; 705/68
(58) Field of Classification Search .................... 713/168
See application file for complete search history.

(56) References Cited

U.S. PATENT DOCUMENTS

| | | | | |
|---|---|---|---|---|
| 5,737,421 | A * | 4/1998 | Audebert | 713/170 |
| 6,292,827 | B1 * | 9/2001 | Raz | 709/217 |
| 2001/0042212 | A1 | 11/2001 | Du et al. | |
| 2002/0083322 | A1 | 6/2002 | Lagosanto et al. | |
| 2002/0174071 | A1 | 11/2002 | Boudou et al. | |
| 2004/0172339 | A1 * | 9/2004 | Snelgrove et al. | 705/26 |
| 2005/0202803 | A1 * | 9/2005 | Mahalal | 455/410 |
| 2006/0085303 | A1 * | 4/2006 | Reeb | 705/31 |

FOREIGN PATENT DOCUMENTS

EP       1 361 527 A1    11/2003

OTHER PUBLICATIONS

International Search Report for PCT/IB2006/001684 mailed Oct. 26, 2006 (3 pages).
Written Opinion of International Searching Authority mailed Oct. 26, 2006 (5 pages).
International Preliminary Report on Patentability and Written Opinion dated Jan. 10, 2008 (7 pages).

* cited by examiner

*Primary Examiner* — Nathan Flynn
*Assistant Examiner* — Bryan Wright
(74) *Attorney, Agent, or Firm* — Osha Liang LLP

(57) ABSTRACT

In general, the invention relates to a method for executing at least a portion of a server operation. The method includes providing an extension to a client connected to the server, where the extension includes a portable object connected to the client. The method further includes performing at least the portion of server operation by the extension, where performing at least the portion of the server operation includes executing a copy of at least a portion of server software stored on the portable object.

16 Claims, 4 Drawing Sheets

METHOD AND SYSTEM USING A PORTABLE OBJECT FOR PROVIDING AN EXTENSION TO A SERVER

The present invention concerns the domain of servers offering services to at least one client, and more particularly of Internet servers offering on-line services.

TECHNICAL FIELD

Internet now offers a wide variety of useful services and applications. Most of those use the client/server model, in which a client makes requests to a central server(s). There can be many simultaneous client requests, while the server is often a single machine (a cluster of computers at most).

The limiting factor in those systems is often the server physical capabilities: its available bandwidth and its computational power. Indeed, the client request hardly fills the client's bandwidth nor uses all its power, whereas the collection of all client requests can result in high loads on the server part, either permanently or punctually, and even overload said server. There are a lot of cases in which the server must deal with a high number of connections simultaneously.

One way to solve this problem, developed recently, is to delegate part of the computing to the client (distributed computing): the necessary server computations are reduced by the amount done on the client side. The bandwidth can be reduced by using a compression scheme or by reducing the amount of data to transfer (since part of it is handled by the client). The client's storage can also be used to decrease the amount of data stored on the server side.

However, another main problem arises when the server needs to offer a service with a high degree of security and/or tamper proof. Indeed, in the common distributed computing model, the client side is far from trustworthy: it may be compromised by third parties through worms or viruses or even by the client itself when cheating the server has some interest for the client. Therefore it is not possible to use the distributed computing model described here above for "secured" services and we have the common restrictions of the client/server model under high-loads. In the following sections we use two examples of those high-load systems, not limiting the scope of the invention, which faces the above issues.

The first example is on-line declaration and payment of taxes. The main server authenticates the citizen and guarantees a date of declaration/payment. It is evident that such a server must be protected from both third parties and the user himself. Usually, on the due date the server faces a high number of requests simultaneously, which engenders at best a slow processing time for each requests.

The second example concerns on-line massively multi-player games. In this example, the server must resolve every action realized by the players and send back the results. It is quite a greedy process in terms of computational power and bandwidth. To avoid cheating, it cannot delegate most of those computations to client's computers. In recent years those games have developed widely and it is common for a single server to host thousands of players all day.

An aim of the present invention is to reduce the connection load on the server.

Another aim of the present invention is to offer a secure and trustworthy service.

SUMMARY OF THE INVENTION

This invention concerns a method for extending a server connected with at least one client(s), characterized in that it consists in providing said extension on the client side by means of a portable object which is connected to said client and which performs at least one of the server's operation(s) in part or entirely.

This invention also concerns a system and a portable object in which said method is implemented, and a program to implement said method.

BRIEF DESCRIPTION OF THE DRAWINGS

Other purposes, features and advantages of the invention will appear on reading the description which follows of the implementation of the method according to the invention and of a mode of realisation of a portable object designed for this implementation, given as a non-limiting example, and referring to the attached drawings in which.

BEST WAY OF REALISING THE INVENTION

The method according to the present invention belongs to the field of electronic assembly and for example portable object such as a smart card comprising at least processing means such as a processor, storage means such as a memory and connectors able to connect said portable object to at least a portable object-accepting device with which the portable object is able to work or dialog. In the embodiment described hereafter, the portable object-accepting device is a client.

The smart card is a small plastic device, which contains one or more embedded integrated circuits. A card with integrated circuit can be for example a microprocessor card.

Smartcards have developed in such a way as to now offer a high computing power associated with larger storage space (flash memories and external memories). Recently it has also included the same protocols of communication as the Internet, and high speed physical Input/Outputs (like USB for instance). In particular, they have the capability to use the host computer as an Internet access point, transparently for the host.

The method according to the present invention allows performing secure operation in an insecure environment comprising the client by using said portable object that constitutes a secure environment. So by using a portable such as a smart card, those operations are processed in a secure way. In addition, by performing operations previously handled by the server, the portable object reduces the server overload.

Figure 1:
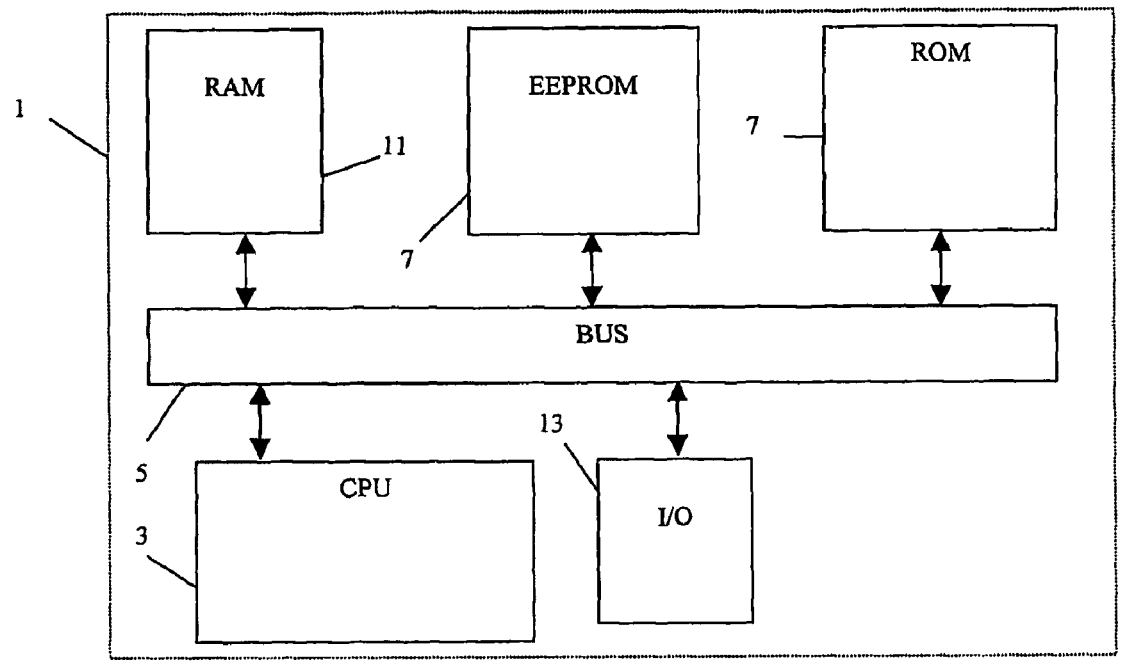
FIG. 1 is a schematic view of an example of realization of an electronic unit integrated in a portable object such as a smart card according to the present invention.

In a particular embodiment of the present invention shown in FIG. 1, the portable object is a smart card with an integrated electronic unit 1: the electronic unit 1 comprises at least a microprocessor CPU 3 with two-way connection via an internal bus 5 to a non volatile memory 7 of type ROM, EEPROM, Flash, FeRam or else storing at least a program to be executed, a volatile memory 11 of type RAM and input/output means I/O 13 to communicate with the exterior and hereafter with the server and the client. The unit 1 may comprise additional components not shown, connected to the internal bus. This type of unit is generally manufactured as a monolithic integrated electronic circuit, or chip, which once physically protected by any known means can be assembled on the integrated circuit card or similar for use in various fields, such as the bank and/or electronic payment cards, mobile radio telephony, pay television, health and transport . . . .

The system of the present invention also comprises a server connected to at least a client. The server offers information, services, and functionalities or else at disposal. The client makes requests to the server to exploit that information. The server and the client may have numerous possible forms of realization. They comprise at least processing means such as a processor, storage means such as a memory and connectors able to connect said server and client to each other and to other device such as said portable object for the client.

The principle of the method according to the present invention is the following.

The client/server model allows a distribution of processing between clients who ask for needed information to the server. In the present invention, the clients also ask said portable object to obtain some of these information.

The present invention is an extension of the client/server model which uses distributed computing on secure portable objects to implement "trusted server extensions" on the client side.

The invention consists in creating a trusted extension of the server with a Secure Portable Object (SPO), at the client's side. Most of the time, the client will communicate with the SPO to handle the client's requests, the SPO will only contact the server from time to time (see FIG. 2—Traffic designed by the number ⑥ in part supported by the traffic between the client ① and the card ④). The extension is then such that it reduces both the cpu needed on the server side and the data flow between the client and the server.

Figure 2:
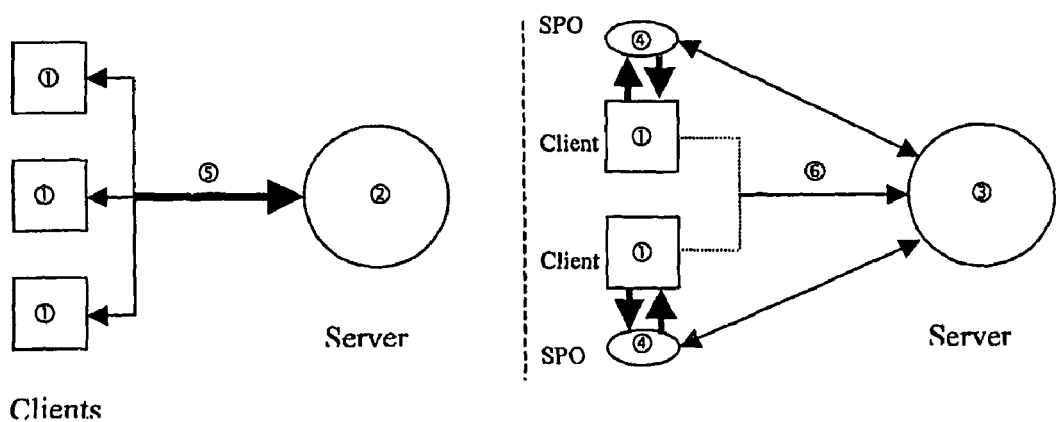
FIG. 2 is divided into two parts allowing to compare: on the left, a schematic view of the different steps of the known client/server process and on the right, a schematic view of a non-limiting mode of realization of the different steps of the method according to the present invention.

FIG. 2 compares the traditional client/server model on the left with the improved model according to the present invention on the right. In the traditional model, clients ((①)) send requests to the server ((②)), and the total amount of requests puts a high load on the server resources ((⑤)). In the improved model, the server ((③)) is slightly modified to communicate with SPO ((④)) at the clients' home. The SPO handles part of the server job so that most of the communications are local between SPO and client's computers. Clients may still communicate with the server for generic or complex services, and SPO may have to report information back to the server but the sum of all data flows is less than in the previous model ((⑥)).

In the illustrated embodiment, SPO is connected directly to the client. The client is connected directly to the server. SPO is connected indirectly to the server via the client and can communicate directly with the server via the network layer as shown by FIGS. 2 and 3.

Figure 3:
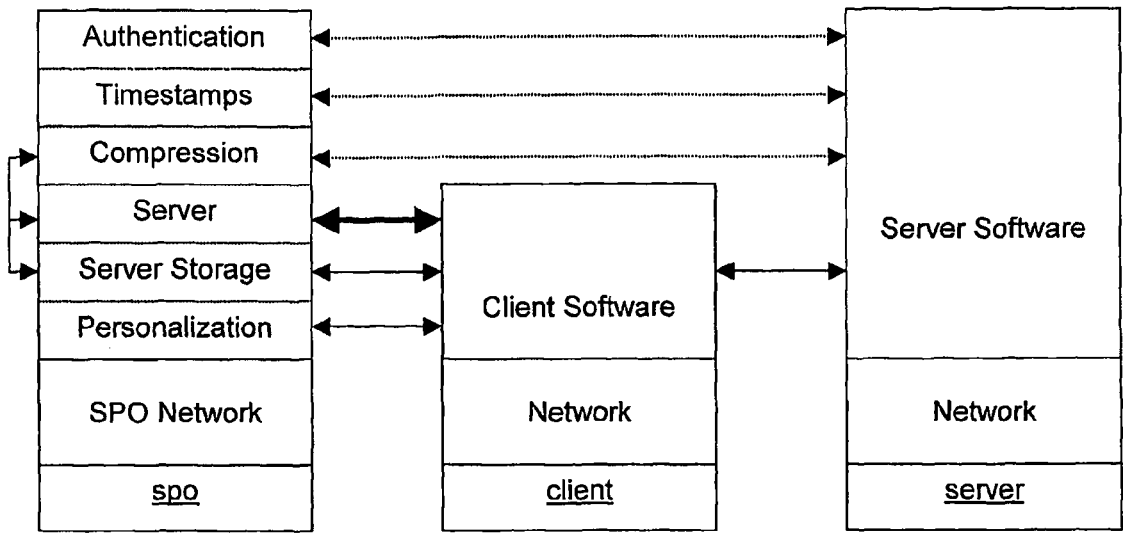
FIG. 3 is a schematic view of a non-limiting mode of realization of the main components of the portable object according to the present invention of two types, the "trusted" ones in grey and the "extension" ones designated by arrows and their relation with the server and/or with the client.

FIG. 3 describes the main components of the extension SPO and their interactions with other actors. First, the SPO is network enabled thanks to new known technologies. This is the basic under layer of all communications between SPO, clients and servers.

The method according to the present invention comprises two parts: the "trusted" part (represented on FIG. 3 in grey) and the "extension" part (designated on FIG. 3 by arrows).

The "trusted" part ensures the server can safely rely on data from the various SPOs at the clients' side, and requires the following capabilities:
Authentification
Personalization
Timestamps Those gray areas allow implementing a trusted link with the SPO. The Authentication and Timestamp parts communicate with the server to establish a trusted, encrypted link and a trusted time reference. The Personalization part is used by the client to retrieve the user personal data, as if stored on the central server. It also eases the identification and login phases with the server.

The "extension" part reduces the load on the server by doing part of the server job and optimizing the whole process. It includes:
Part of the server software
Part of the server storage
A data compression scheme The white areas on FIG. 3 implement the server extension itself. Part of the server software is delegated to the SPO. This software handles client's requests (or some of them), and local storage for user related information. The SPO uses a compression scheme with the server to report back requests' relevant results, so that the bandwidth is even further reduced.

To implement the "trusted" part (represented on FIG. 4), the SPO uses its security capabilities to implement an authentication protocol (for instance encryption capabilities). First, the SPO establish a secure link through any available authentication and encryption protocol ((①)—FIG. 4). The client is then unable to tap this link, even if it acts as a proxy (thus preventing cheating from the user side). As the authentication is done by the SPO, the user is relieved from almost all authentication procedures with the server. As it is done once, the authentication does not use up too many resources.

Figure 4:
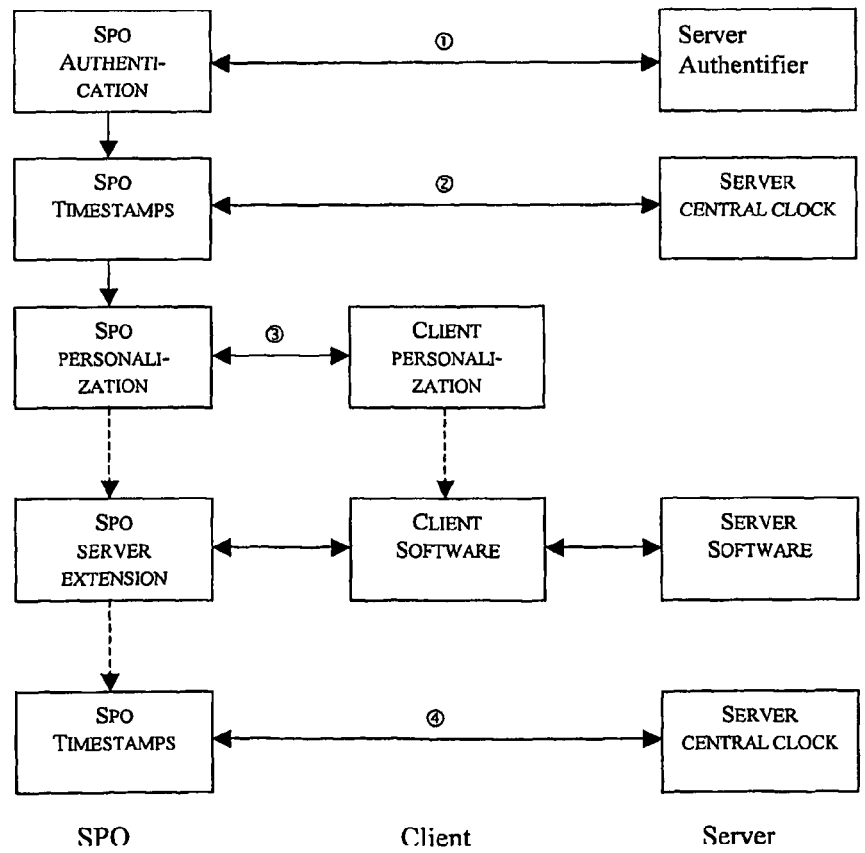
FIG. 4 is a schematic view of a non-limiting mode of realization of the different steps of the method according to the present invention implemented by the components of the "trusted" type illustrated on FIG. 3.

The SPO can then optionally obtain a time reference from a server clock ((②)—FIG. 4). This reference may be used to validate operations if they are transmitted far later. The SPO exchanges time stamps with the server, after authentication, to obtain a valid date that can be used as proof of transactions' time. It is a necessary part for services that have a time constraint.

Next, the client can retrieve personalized data from the SPO, without asking the server ((③)—FIG. 4). The SPO may contain pre-personalized information about the user, which will speed the user inputs, and relieve the server from that necessary stage. These data have the same degree of trustworthiness than from the server. That stage can protect against some third parties man in the middle attacks.

The SPO and the client then enter in normal execution mode (FIG. 4).

Lastly, the SPO may report back data, encrypted, and time stamped ((④)). The server can consider this as if itself did the transaction.

The distribution of the SPO is ensured by the service operators, which can then trusts the SPO personalization stage.

For the "extension" part (FIG. 5), the server software is re-designed so that part of its work is done on the SPO. Most often, a client request is easy to handle, only the cumulated amount of requests creates an overload. The SPO can then handle easily simple requests from a single client and report only to the server the results of a whole batch of requests. In other cases, the SPO can handle intermediate calculus for a request and help simplify the whole request on the server side.

The SPO can also apply a compression scheme on its data, so that the needed bandwidth between SPO's client and the server is even further reduced. All the request data and results, as well as personalized information may be stored on the SPO, thus reducing the amount of storage needed on the server. The server can also use the SPO as a generic distributed storage network.

Figure 5:
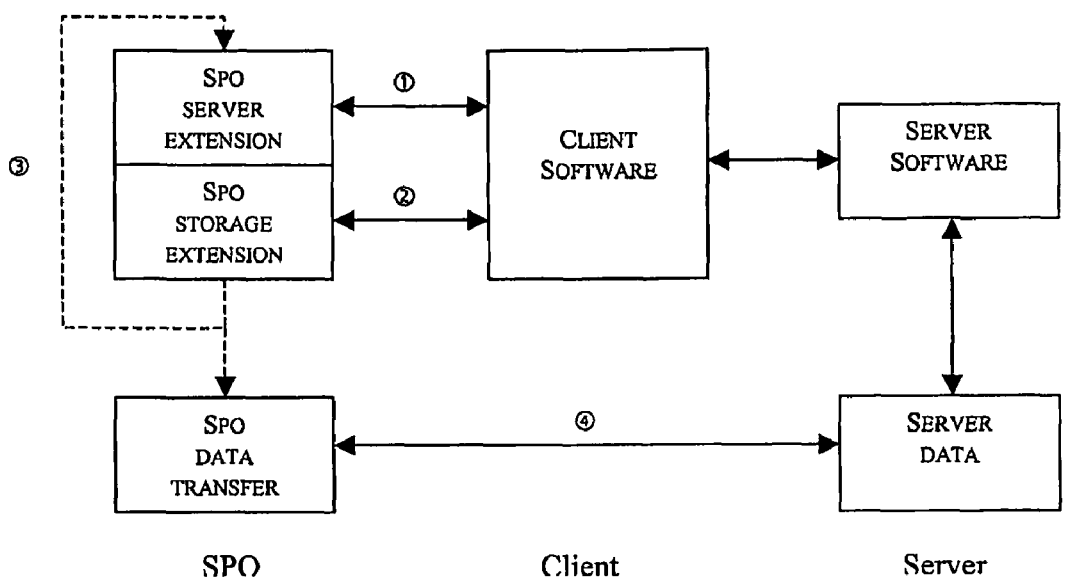
FIG. 5 is a schematic view of a non-limiting mode of realization of the different steps of the method according to the present invention implemented by the components of the "extension" type illustrated on FIG. 3.

One example of implementation of the server extension mechanism is described in relation to FIG. 5. The server software is divided so that part of it resides on the SPO. Most of the time, the client will ask the SPO for requests (①) or information (②). The client's software runs in a loop (③), asking requests till termination. Periodically (or just at the end), the SPO may have to report back and/or synchronize data with the server (④). This stage may use compression to relieve the bandwidth and the time stamps to help the synchronization process.

The advantages offered by such a method and system are numerous. The method and system according to the present invention reduce the connection load on the server, the computation power needed, and even the storage space. The benefits are a better quality of service or an increased number of simultaneous users.

Two examples of application of the present invention are described hereafter in detail.

Figure 6:
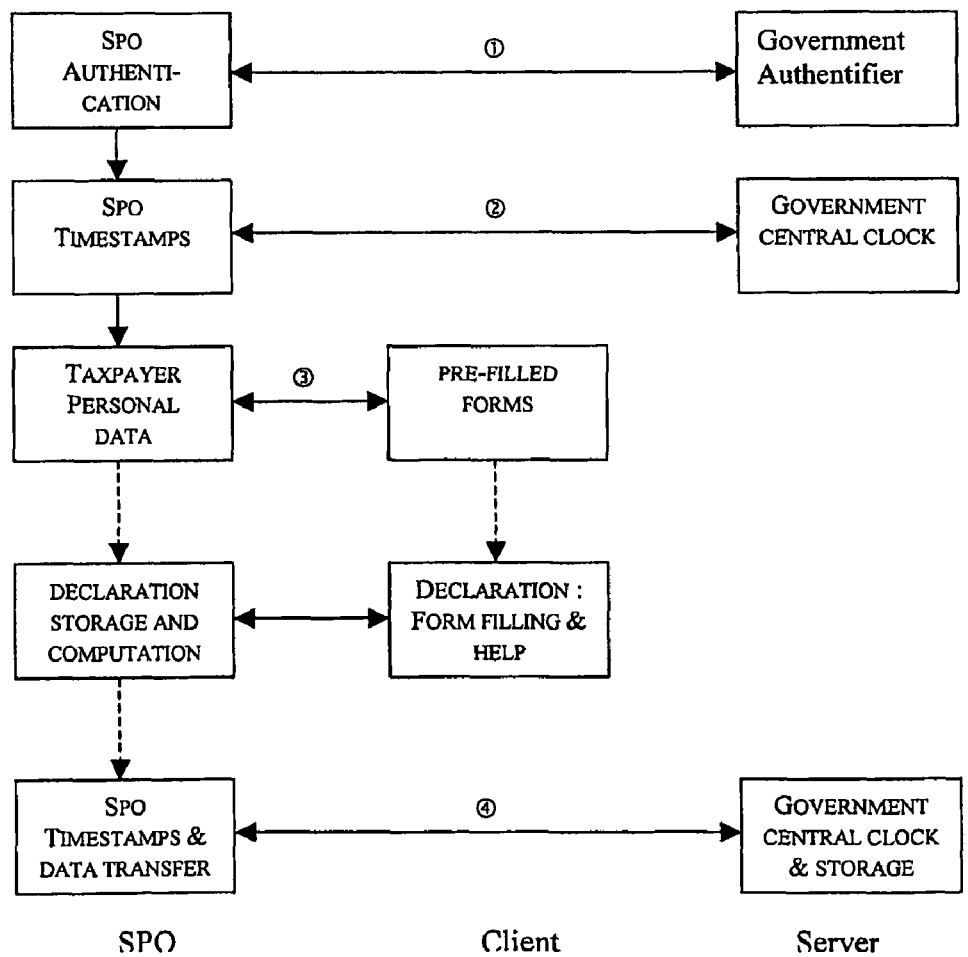
FIG. 6 is a schematic view of a practical example of a use of the portable object according to the present invention.

The first application is on-line declaration of taxes (FIG. 6). The characteristics in this system are:
Strong security needed to protect against third-party attacks.
High-load on a given date, with grave consequences.

In the present invention, the government distributes the SPO with the common paper declaration (with only a little added cost), and all the taxpayer personalized information (address, civil state, etc. . . . ).

When the taxpayer wants to declare online, he simply connects the SPO to its computer (and therefore with the internet). The SPO then authenticates itself and the user to the government official server (step ① on FIG. 6), helped by the personal data stored on the SPO. It then retrieves a valid date stamp or timestamp from the server for the declaration (step ② on FIG. 6). That is the only necessary step between client/SPO and server (far less than traditional model). All the following steps (represented by step ③ on FIG. 6) of a declaration (form filling, getting help and computing the estimated amount of taxes for instance) are done between the client's computer and the SPO, which holds the required forms, pages and computation formulas. The client can use personal data stored on SPO, to obtain partially filled forms (for declaration), help and computation tools or else. In the last, to submit the declaration (step 4 on FIG. 6), the user then have two solutions: either connects back to the server and reports the submitted declaration to the server in a compressed, encrypted file, or just send back the SPO to the local administration, where the stored timestamp will serve as proof that the declaration was on-time.

The second application deals with massively multiplayer games. In the known systems, the server keeps a huge virtual world state in memory, including players' characters. Players can interact with the world and with one another. The players' interactions with the world must all be resolved by the server in order to prevent cheating. The server is at all time connected to thousands of players, the number being only limited by the server capability (the more players there are, the more interesting it becomes). The characteristics then are:
Strong security needed to protect against user attacks.
High-load all day long, limiting the scope of the game.

In the present invention (illustrated on FIG. 7), SPO are distributed with the game CD, through the usual game case. The SPO serves as authentication of a rightful owner (including even payment of the game fees), and as storage of the player information (characters, points, etc. . . . ): easier access for the player and less storage for the server. The main point of the invention is however that the SPO-server pair is designed so that the SPO does a part of the server job.

For instance, a simple solution is that the SPO can handle every action impacting only the player himself (no synchronization needed between SPO and server). In more complex scenarios, the server can use the timestamp on the SPOs (trusted dates) to synchronize conflicting actions. The SPO can connect to the game server on a limited basis and only for conflicting actions or for periodical "summaries", which will drastically reduce the needed bandwidth.

Figure 7:
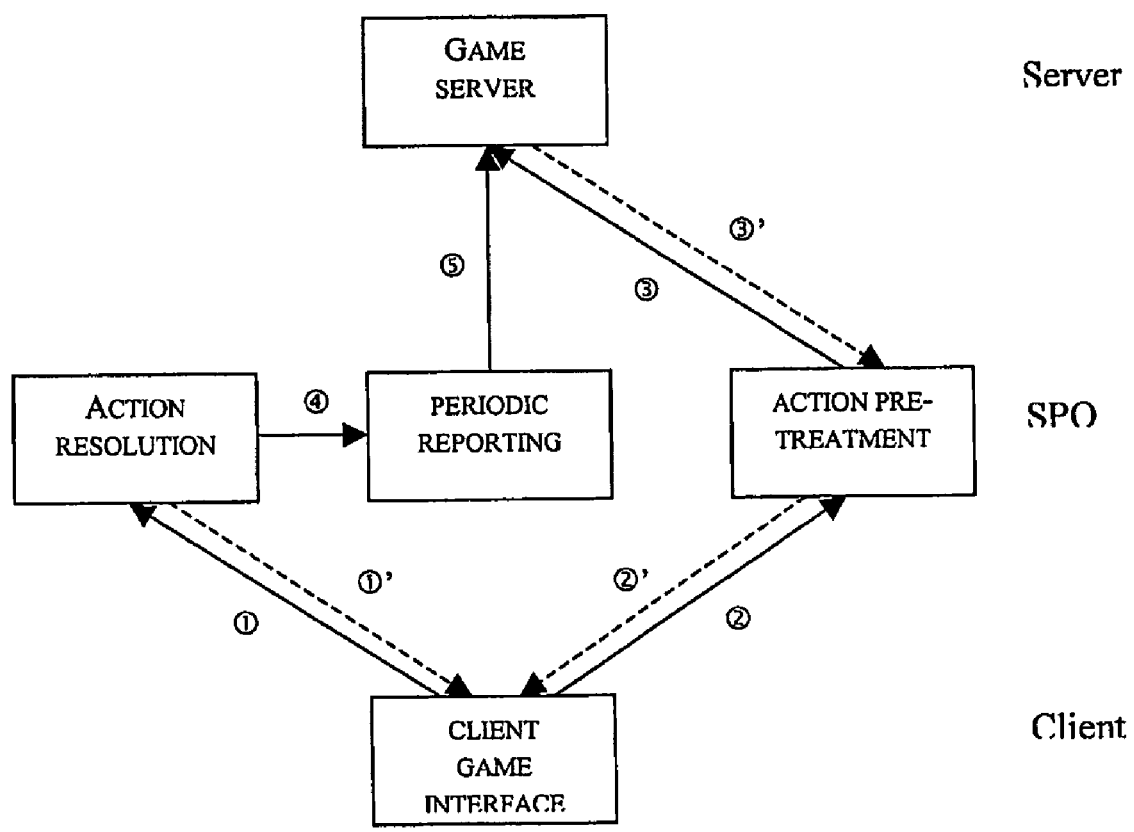
FIG. 7 is a schematic view of another practical example of a use of the portable object according to the present invention.

FIG. 7 describes the execution model in the multi-players games, which is a bit more complicated. Indeed the SPO cannot do all the server's work. Some simple or non-conflicting actions done by the player are entirely resolved by the card (SPO) and answered immediately (① and ①'). The SPO must report back from time to time to the server (for backup or tracking purposes), summing up all these actions results (④ then ⑤). Some conflicting actions require treatment by the central server. These are pre-treated by the SPO to relieve the server as much as possible and then forwarded to the server (② then ③). The actions results are sent back through the SPO (③' then ②').

The invention claimed is:

1. A computer implemented method for performing a distributed server operation comprising:
   authenticating, to a server, a portable object connected to a client, wherein the portable object comprises an extension part and a trusted part for the authenticating, and wherein trust for the trusted part of the portable object is established using a cryptographic operation provided by the portable object;
   performing, by the extension part to generate a result, a portion of the server operation, wherein performing the portion of the server operation comprises executing a copy of a first portion of server software stored on the portable object; and
   sending the result to the server, wherein the server software is divided into the first portion executed by the portable object and a second portion for the server to execute.

2. The method of claim 1, wherein the trust for the trusted part of the portable object is further established using a secure environment.

3. The method of claim 1, wherein the server operation comprises processing a request sent from the client to the server and wherein performing at least the portion of the server operation comprises processing the request to obtain a result, and wherein the portable object is configured to send the result to the server.

4. The method of claim 1, further comprising:
   establishing a secure link between the portable object and the server using at least one selected from a group consisting of an authentication and encryption protocol.

5. The method of claim 1, further comprising: obtaining a time reference by the portable object from the server, wherein the time reference is used to perform at least the portion of the server operation.

6. The method of claim 3, wherein the portable object comprises a compression/decompression means and wherein the compression/decompression means is configured to compress the result.

7. The method of claim 1, wherein the portable object is configured to store information to enable the client and the server to interact.

8. The method of claim 1, wherein the server operation is filing a tax declaration, wherein the portable object is configured to retrieve a valid time stamp from the server as a proof of a declaration date for the tax declaration, where a declarant for the tax declaration is authenticated by the portable object, and wherein filing the tax declaration comprises filling at least a portion of a tax declaration form by the portable object.

9. The method of claim 1, wherein the server operation comprises resolving at least a portion of actions perform by a player of an on-line game, wherein the on-line game is executing on the server.

10. A system comprising: a server comprising server software, wherein the server software is divided into a first portion for a portable object to execute and a second portion for the server to execute;
a client connected to the server;
wherein the portable object is connected to the client, the portable object comprising: an extension part and a trusted part for authenticating the portable object to the server, wherein trust for the trusted part of the portable object is established using a cryptographic operation provided by the portable object;
and a copy of the first portion of the server software, wherein the extension part of the portable object is configured to perform a portion of a server operation by executing the copy of the first portion of the server software.

11. An electronic module comprising: a data storing means comprising software configured to enable the electronic module to connect to a client and a copy of a first portion of server software, wherein the client is configured to connect to a server comprising a second portion of server software, wherein the server software is divided into the first portion for the electronic module to execute and the second portion for the server to execute;
and a data processing means comprising an extension part and a trusted part, wherein the trusted part is configured to authenticate the electronic module to the server, and the extension part is configured to perform a portion of a server operation by executing the copy of the first portion of the server software, and wherein trust for the trusted part is established using a cryptographic operation provided by the data processing means.

12. The electronic module of claim 11, wherein the data storage means further comprises pre-personalized information about a user of the electronic module.

13. A portable object comprising:
an electronic module,
wherein the electronic module comprises:
a data storing means comprising software configured to enable the electronic module to connect to a client, wherein the client is configured to connect to a server comprising server software,
wherein the server software is divided into a first portion for the electronic module to execute and the second portion for the server to execute, and
store a copy of the first portion of server software; and
a data processing means comprising an extension part and a trusted part, wherein the trusted part is configured to authenticate the electronic module to the server, and the extension part is configured to perform at least a portion of a server operation by executing the copy of the first portion of the server software, and wherein trust for the trusted part is established using a cryptographic operation provided by the data processing means.

14. A non-transitory computer readable medium comprising program code instructions for executing a distributed server operation, the method comprising:
authenticating, to a server, a portable object connected to a client, wherein the portable object comprises an extension part and a trusted part for the authenticating;
enabling communication between the client and the portable object, wherein the portable object comprises an extension part and a trusted part for the authenticating,
wherein trust for the trusted part of the portable object is established using a cryptographic operation provided by the portable object; and performing, by the extension part, a portion of the server operation,
wherein performing the portion of the server operation comprises executing the copy of a first portion of server software stored on the portable object;
sending the result to the server;
and wherein the server software is divided into the first portion executed by the portable object and a second portion for the server to execute.

15. The method of claim 1, wherein the server operation comprises processing a request sent from the client to the server and wherein performing at least the portion of the server operation comprises processing the request to obtain a result, and wherein the portable object is configured to send the result to the server as part of a batch of results.

16. A computer implemented method for performing a distributed server operation
comprising: authenticating, by a server, a portable object connected to a client, wherein the portable object comprises an extension part and a trusted part for the authenticating,
wherein the extension part performs a first portion of the server operation and wherein trust for the trusted part of the portable object is established using a cryptographic operation provided by the portable object;
receiving a result from a portable object to the server, and wherein the result is generated by performing the first portion of the server operation by the portable object;
and performing, using the result, a second portion of the server operation by the server, wherein performing the second portion of the server operation comprises executing a copy of a second portion of server software stored on the server, wherein the server software is divided into the first portion for the portable object to execute and the second portion executed by the server.

* * * * *